(12) United States Patent
Teufl

(10) Patent No.: US 10,941,962 B2
(45) Date of Patent: Mar. 9, 2021

(54) HEATING SYSTEM COMPONENT AND METHOD FOR PRODUCING SAME

(71) Applicant: Bleckmann GmbH & Co. KG, Lamprechtshausen (AT)

(72) Inventor: Gernot Teufl, Hallein (AT)

(73) Assignee: Bleckmann GmbH & Co. KG, Lamprechtshausen (AT)

( * ) Notice: Subject to any disclaimer, the term of this patent is extended or adjusted under 35 U.S.C. 154(b) by 1080 days.

(21) Appl. No.: 14/918,303

(22) Filed: Oct. 20, 2015

(65) Prior Publication Data

US 2016/0109152 A1 Apr. 21, 2016

(30) Foreign Application Priority Data

Oct. 21, 2014 (EP) .................................... 14189693

(51) Int. Cl.
*F24H 1/10* (2006.01)
*F24H 9/20* (2006.01)
(Continued)

(52) U.S. Cl.
CPC ........ *F24H 1/101* (2013.01); *A47J 27/21041* (2013.01); *A47J 27/21083* (2013.01); *A47J 27/21108* (2013.01); *A47J 27/21133* (2013.01); *A47J 31/44* (2013.01); *A47J 31/56* (2013.01); *A47L 15/4285* (2013.01);
(Continued)

(58) Field of Classification Search
CPC .......... F24H 1/101; F24H 1/102; F24H 9/181; F24H 9/2028; H05B 1/02; H05B 1/0297; H05B 3/04; H05B 3/28; H05B 3/30; H05B 3/42; H05B 3/48; H05B 3/50; H05B 3/78; H05B 3/82; H05B 2203/016; H05B 2203/017; A47J 27/106; A47J 27/21041; A47J 27/21066; A47J 27/2105;
(Continued)

(56) References Cited

U.S. PATENT DOCUMENTS 4,270,067 A 5/1981 Thomas et al.
4,908,501 A * 3/1990 Arnold, III ............ A01K 7/027
119/73
(Continued)

FOREIGN PATENT DOCUMENTS

CA 1 202 659 A 4/1986
CN 101116886 A 2/2008
(Continued)

OTHER PUBLICATIONS

Extended European Search Report, dated Mar. 3, 2016, for related European Application No. 15190848.0-1808, 6 pages.
(Continued)

*Primary Examiner* — Justin C Dodson
(74) *Attorney, Agent, or Firm* — Seed IP Law Group LLP

(57) ABSTRACT

A heating system component for a heating system for heating a fluid medium is provided. The heating system component includes: a carrier unit comprising a wet side, wherein said wet side corresponds to a surface of said carrier unit configured to be in contact with said fluid medium; and a heating unit. The heating unit may be coupled to the carrier unit via soldering, laser welding, gluing, ultrasonic welding, and/or friction welding. The carrier unit may comprise aluminum.

4 Claims, 7 Drawing Sheets

(51) Int. Cl.
  *A47J 27/21* (2006.01)
  *H05B 3/48* (2006.01)
  *A47J 31/44* (2006.01)
  *H05B 3/78* (2006.01)
  *A47J 31/56* (2006.01)
  *A47L 15/42* (2006.01)
  *F24H 9/18* (2006.01)
  *H05B 3/04* (2006.01)
  *H05B 3/42* (2006.01)

(52) U.S. Cl.
  CPC ........... *F24H 1/102* (2013.01); *F24H 9/1818* (2013.01); *F24H 9/2028* (2013.01); *H05B 3/04* (2013.01); *H05B 3/42* (2013.01); *H05B 3/48* (2013.01); *H05B 3/78* (2013.01); *H05B 2203/017* (2013.01)

(58) Field of Classification Search
  CPC ........... A47J 27/21083; A47J 27/21108; A47J 27/21133; A47J 27/2166
  USPC .......... 219/212–214, 412–414, 443.1, 446.1, 219/448.11, 448.17, 448.18, 494, 121.6, 219/121.61, 121.62, 121.63, 121.64; 392/308, 311, 314, 318, 322, 341, 351, 392/497
  See application file for complete search history.

(56) References Cited

U.S. PATENT DOCUMENTS

| | | | |
|---|---|---|---|
| 6,486,446 B1 | 11/2002 | Kao | |
| 7,566,849 B2* | 7/2009 | O'Connor | H05B 3/56 219/211 |
| 8,094,998 B2* | 1/2012 | Rijskamp | F24H 9/1818 392/448 |
| 2006/0236999 A1* | 10/2006 | Pleschinger | F24H 9/2028 126/373.1 |
| 2010/0170050 A1* | 7/2010 | Inose | B23K 9/025 14/73 |
| 2012/0175359 A1* | 7/2012 | Zimmerer | F24D 13/022 219/213 |
| 2012/0180316 A1* | 7/2012 | Montanaro | B23K 26/103 29/890.051 |
| 2012/0298638 A1* | 11/2012 | Beck | B23K 26/24 219/121.64 |
| 2013/0055902 A1* | 3/2013 | Berto | A47J 31/542 99/281 |
| 2013/0202279 A1* | 8/2013 | Reichl | A47J 31/542 392/480 |
| 2013/0313247 A1* | 11/2013 | Rubio | A47J 36/02 219/621 |

FOREIGN PATENT DOCUMENTS

| | | |
|---|---|---|
| CN | 102297506 A | 12/2011 |
| CN | 102430867 A | 5/2012 |
| DE | 1 299 379 B | 7/1969 |
| EP | 0 848 576 A2 | 6/1998 |
| EP | 1 238 614 A1 | 9/2002 |
| EP | 1 808 109 A2 | 7/2007 |
| GB | 2 338 632 A | 12/1999 |
| GB | 2539226 A | 12/2016 |

OTHER PUBLICATIONS

Extended European Search Report, dated Mar. 3, 2016, for related European Application No. 15190853.0-1808, 6 pages.

* cited by examiner

HEATING SYSTEM COMPONENT AND METHOD FOR PRODUCING SAME

BACKGROUND

Technical Field

The present disclosure relates to a heating system component, to a heating system for heating fluid media, and to a method for providing a heating system component.

Field of the Invention

For many types of domestic appliances or domestic machines, it is necessary to heat up a fluid medium, such as for example water. Heating up can be caused by means of one or more heating systems. To that extent, a medium circuit can be provided, a pump arranged in the circuit causing circulation of the medium in the circuit.

Basic aspects of such heating systems are that, like all other components of the medium circuit, the system is to take up only a small amount of space and is to be inexpensive to produce. Furthermore, the heating system shall be simple to assemble. Reliable safeguarding of the heating system must be guaranteed upon the occurrence of a critical operating condition which can result in plastic components within the domestic appliance melting or catching fire. In case of some domestic appliances, it may further be necessary to prevent the medium to be heated from exceeding a predetermined temperature. For example in the case of a dishwashing machine, it may be necessary to prevent the washing water from exceeding its boiling temperature.

US patent application 2006/0236999 A1 discloses a heating system for heating fluid media, in particular for domestic appliances, including a carrier unit, a heating unit arranged on the carrier unit and a heat transfer element which is arranged on the carrier unit and comprising a material which is a good conductor of heat. On the heat transfer element, temperature safety devices are mounted by fixing elements via corresponding through apertures.

It is a general object of the manufacture of heating systems and heating system components to provide ever smaller and more compact construction parts, which provide a sufficient heating power (if not the same heating power as before). It is a further object to reduce manufacturing costs.

In addition, when using conventional temperature monitoring and/or control elements (such as, e.g., thermal fuses) with continuous-flow water heaters, there is a problem when the temperature monitoring and/or control elements are fixed with, e.g., one or more screws, to a mounting plate. That is, when the mounting plate is soldered to the heating unit, it may curve. Further, when fastening respective fixing screws on a temperature monitoring and/or control element, the temperature monitoring and/or control element may be lifted from the fixing plate and remain in the air above the hot location. As a consequence, the largest amount of heat in the center of the heating unit cannot be released directly to the temperature monitoring and/or control element, but has to be released via, e.g., the mounting plate, screws, and/or the base plate flange. These effects result in an unacceptable (i.e., too slow) response time of the temperature monitoring and/or control element.

BRIEF SUMMARY

Embodiments of the present invention provide a heating system component, a heating system, and a method for providing a heating system component, which avoid shortcomings of prior-art heating systems.

According to a first aspect of the present invention, there is provided a heating system component for a heating system for heating a fluid medium, said heating system component comprising: a carrier unit comprising a wet side, wherein said wet side corresponds to a surface of said carrier unit configured to be in contact with said fluid medium; a heating unit arranged on said wet side of said carrier unit and configured to be in contact with said fluid medium; wherein said heating unit is coupled to said carrier unit by means of a coupling step, wherein said coupling step comprises at least one of a soldering step, a laser welding step, a gluing step, an ultrasonic welding step, and/or a friction welding step.

By providing the heating unit on the wet side of the carrier unit rather than on the dry side, heat generated by the heating unit can be transferred more efficiently to the fluid medium to be heated. This is because the heating unit is immersed directly in the fluid medium. In an embodiment, a significant part of the surface of the heating unit is in direct contact with the fluid medium. Consequently, heating power is used more efficiently and the overall size of the heating system can be reduced. In an embodiment, the heating system's overall cost can be further reduced by employing aluminum as a material for the heating unit and/or for the carrier unit.

In an embodiment, said heating unit comprises a first cross section which is perpendicular to an axial direction of said heating unit, wherein said first cross section corresponds to a trapezoid with rounded edges. Choosing rounded edges for the heating unit's cross section generally simplifies the manufacturing of the heating unit, because it is possible to start from a tubular element with a cross section that may be, e.g., circular, which is subsequently stepwise deformed into a trapezoid with rounded edges. Choosing a trapezoid form further provides for the possibility to couple a substantially flat surface of the heating unit to the wet side of the carrier unit. Thereby, not only is it possible to attach the heating unit to the carrier unit more strongly, but a heat transfer to the carrier unit is also improved. This makes it possible to provide one or more temperature monitoring and/or control units on the carrier unit's dry side (i.e., a surface of the carrier unit which is opposite to the wet side).

In an embodiment, said heating unit comprises a first cross section which is perpendicular to an axial direction of said heating unit, wherein said first cross section corresponds to a hat-like trapezoid with rounded edges. In addition to the above-noted advantages of a trapezoid with rounded edges, choosing a hat-like form involves the further advantage that the coupling strength between heating unit and carrier unit when employing laser welding to attach heating unit to carrier unit can be improved. This is because wing-like features on a side surface of the heating unit provide additional material which can be melted into the carrier unit during the laser welding process. In an example, the hat-like shape may correspond to a bell-like shape.

In an embodiment, said heating unit comprises a first nonstick coating layer; wherein said coupling step comprises a gluing step. Since the heating unit is provided on the wet side of the carrier unit, the heating unit is in direct contact with the fluid medium to be heated. The heating unit's surface might thus be degraded by scale deposition or by aggressive dishwasher detergents. Providing a nonstick coating layer helps to protect the heating unit's outer surface so that a longer lifetime of the heating system can be achieved.

In an embodiment, said carrier unit comprises aluminum, wherein said wet side of said carrier unit comprises a second nonstick coating layer. The wet side of the carrier unit is in direct contact with the fluid medium to be heated. The wet side can thus be degraded by scale deposition or by aggressive dishwasher detergents. Providing a nonstick coating layer helps to protect the wet side of the carrier unit so that a longer lifetime of the heating system can be achieved.

In an embodiment, said first nonstick coating layer and/or said second nonstick coating layer comprises at least one of a ceramics-based material, a sol-gel coating, and/or a plasma coating.

In an embodiment, said heating unit comprises a first nonstick coating layer; wherein said carrier unit comprises a composite material, said composite material comprising at least an aluminum layer and a stainless steel layer, wherein said stainless steel layer is arranged on said wet side of said carrier unit, and wherein said aluminum layer is arranged on a dry side of said carrier unit, wherein said dry side of said carrier unit corresponds to a surface of said carrier unit arranged opposite to said wet side of said carrier unit. By choosing a carrier unit comprising a composite material having a robust surface on the carrier unit's wet side, surface protection of the carrier unit's wet side is no longer necessary. Manufacturing of the heating system is thus overall simplified. In an example, the composite material may be produced by means of a cold roll bonding process.

In an embodiment, said heating unit is coupled to said carrier unit by means of a coupling step, wherein said coupling step comprises a laser welding step.

In an embodiment, the heating system component further comprises a temperature monitoring and/or control unit comprising a lower surface; wherein at least a part of said lower surface of said temperature monitoring and/or control unit is in thermal contact with at least a part of an upper surface of said carrier unit; wherein said lower surface of said temperature monitoring and/or control unit and said upper surface of said carrier unit are coupled to each other by means of a coupling step, wherein said coupling step comprises at least one of a laser welding step, a spot-welding step, a gas tungsten arc welding step, and/or an ultrasonic welding step. In general, employing laser welding for attaching temperature monitoring and/or control elements in heating systems involves the advantage of higher functionality and security as compared to prior art mounting approaches using, e.g., curved spring washers. In particular, fixing the temperature monitoring and/or control element onto the heating unit by welding significantly improves (i.e., reduces) the temperature monitoring and/or control element's response time.

In an embodiment, said temperature monitoring and/or control unit comprises a lower part having a beveled edge; wherein said beveled edge is adjacent to said lower surface; wherein said beveled edge comprises a bevel angle of less than 90°; wherein said welded seam is located essentially along said beveled edge. By employing a beveled edge having a bevel angle of less than 90°, it is easier to reach the contact area between the temperature monitoring and/or control unit's lower surface and the carrier unit's upper surface with a laser beam. As a consequence, less laser power is needed, while still achieving the desired strength of attachment between the temperature monitoring and/or control unit's lower surface and the carrier unit's upper surface.

In an embodiment, the heating system component further comprises a housing unit; and coupling means configured to couple said housing unit to said carrier unit, wherein said coupling means comprise at least one of a force-fitting connection mechanism and/or a shape-locking connection mechanism. In an embodiment, said coupling means comprise a force-fitting connection mechanism, wherein said force-fitting connection mechanism comprises a force-fitting sealing connection. In an example, the force-fitting sealing connection may comprise a polyurethane adhesive. In another example, the force-fitting sealing connection may comprise a silicone adhesive.

In an embodiment, said carrier unit comprises a circular hole; wherein said heating system component further comprises a fluid conducting unit configured to be inserted through said circular hole of said carrier unit; and coupling means configured to couple said fluid conducting unit to said carrier unit, wherein said coupling means comprise at least one of a force-fitting connection mechanism and/or a shape-locking connection mechanism. By coupling the fluid conducting unit to the carrier unit in the above-described manner, a simple and straightforward assembly of the heating system component is made possible. Namely, the fluid conducting unit may be introduced into the circular hole from the wet side and then fixed via one of the above-described mechanisms.

In a further aspect of the invention, there is provided a method of providing a heating system component for a heating system for heating a fluid medium, said method comprising the steps of: arranging a heating unit that is configured to be in contact with said fluid medium on a wet side of a carrier unit, wherein said wet side corresponds to a surface of said carrier unit configured to be in contact with said fluid medium; and coupling said heating unit to said wet side of said carrier unit, wherein said coupling comprises at least one of a soldering step, a laser welding step, a gluing step, an ultrasonic welding step, and/or a friction welding step.

In an embodiment, the method comprises, before coupling said heating unit to said wet side of said carrier unit, applying a nonstick coating to said heating unit, wherein coupling said heating unit to said wet side of said carrier unit comprises gluing said heating unit to said wet side of said carrier unit. Applying said nonstick coating to said heating unit before attaching the heating unit to the carrier unit's wet side greatly simplifies the assembly of the heating system. That is, the heating unit may simply be dipped or immersed in a nonstick coating unit for a given amount of time and afterwards attached to the carrier unit. The tedious and often difficult process of applying a nonstick coating to the heating unit after assembling heating system component is thus no longer necessary.

According to a further aspect of the present invention, there is provided a heating system component for a heating system for heating a fluid medium, said heating system component comprising: a carrier unit comprising a wet side and a dry side, wherein said wet side corresponds to a surface of said carrier unit configured to be in contact with said fluid medium, wherein said dry side is located on a surface opposite to said wet side; a heating unit arranged on said dry side of said carrier unit; wherein carrier unit comprises aluminum.

By arranging the heating unit on the dry side, the carrier unit's wet side is consequently free from edges or undercuts. Therefore, coating the carrier unit's wet side (e.g., with an anti-stick coating) is greatly facilitated.

In an embodiment, said carrier unit comprises a composite material, said composite material comprising at least an aluminum layer and a stainless steel layer, wherein said stainless steel layer is arranged on said wet side of said carrier unit, and wherein said aluminum layer is arranged on said dry side of said carrier unit. By choosing a carrier unit comprising a composite material having a robust surface on the carrier unit's wet side, surface protection of the carrier unit's wet side is no longer necessary. Manufacturing of the heating system is thus overall simplified. In an example, the composite material may be produced by means of a cold roll bonding process.

In an embodiment, said carrier unit further comprises a groove that is configured to receive said heating unit.

In an embodiment, said heating unit comprises a first cross section which is perpendicular to an axial direction of said heating unit, wherein said first cross section corresponds to a hat-like trapezoid with rounded edges; wherein said hat-like trapezoid with rounded edges preferably corresponds to a bell-like trapezoid with rounded edges.

In an embodiment, a cross section of said groove corresponds to said first cross section of said heating unit.

In an embodiment, said heating unit is arranged in said groove, wherein said cross section of said groove and said cross section of said heating unit are chosen such that at least a part of a surface of said heating unit and a part of said dry side form a flat face.

In an embodiment, said coupling step comprises a quilting seam welding step. By means of the quilting seam welding step, a thermal distortion of the entire heating system component can be avoided.

In an embodiment, the heating system component further comprises a temperature monitoring and/or control unit comprising a lower surface; wherein at least a part of said lower surface of said temperature monitoring and/or control unit is in thermal contact with at least a part of an upper surface of said heating unit; wherein said lower surface of said temperature monitoring and/or control unit and said upper surface of said heating unit are coupled to each other by means of a coupling step, wherein said coupling step comprises at least one of a laser welding step, a spot-welding step, a gas tungsten arc welding step, and/or an ultrasonic welding step. In general, employing laser welding for attaching temperature monitoring and/or control elements in heating systems involves the advantage of higher functionality and security as compared to prior art mounting approaches using, e.g., curved spring washers. In particular, fixing the temperature monitoring and/or control element onto the heating unit by welding significantly improves (i.e., reduces) the temperature monitoring and/or control element's response time. In addition, when the heating unit is arranged on the dry side, the temperature monitoring and/or control element may be in direct contact with an outer surface of the heating unit, thereby improving the temperature monitoring and/or control element's response time even further.

In an embodiment, at least a part of said lower surface of said temperature monitoring and/or control unit is in thermal contact with at least a part of an upper surface of said carrier unit; wherein said lower surface of said temperature monitoring and/or control unit and said upper surface of said carrier unit are coupled to each other by means of a coupling step, wherein said coupling step comprises at least one of a laser welding step, a spot-welding step, a gas tungsten arc welding step, and/or an ultrasonic welding step. By having a thermal contact to the carrier unit, the embodiment enables monitoring and/or controlling the temperature of said fluid medium.

According to a further aspect of the present invention, there is provided a method of providing a heating system component for a heating system for heating a fluid medium, said method comprising the steps of: arranging a heating unit on a dry side of a carrier unit, wherein said dry side is arranged opposite to a wet side of said carrier unit, wherein said wet side corresponds to a surface of said carrier unit configured to be in contact with said fluid medium; and coupling said heating unit to said dry side of said carrier unit, wherein said carrier unit comprises aluminum.

According to a further aspect of the present invention, there is provided a heating system component for a heating system for heating a fluid medium, said heating system component comprising: a carrier unit comprising a wet side, wherein said wet side corresponds to a surface of said carrier unit configured to be in contact with said fluid medium; a heating unit arranged on said wet side of said carrier unit and configured to be in contact with said fluid medium; wherein said heating unit is coupled to said carrier unit by means of a coupling step, wherein said coupling step comprises a laser welding step.

According to a further aspect of the present invention, there is provided a method of providing a heating system component for a heating system for heating a fluid medium, said method comprising the steps of: arranging a heating unit a dry side of a carrier unit, wherein said dry side is arranged opposite to a wet side of said carrier unit, wherein said wet side corresponds to a surface of said carrier unit configured to be in contact with said fluid medium; and coupling said heating unit to said dry side of said carrier unit, wherein said coupling comprises a laser welding step.

These and other aspects of the invention will be apparent from and elucidated with reference to the embodiments described hereinafter.

DETAILED DESCRIPTION

Figure 1:
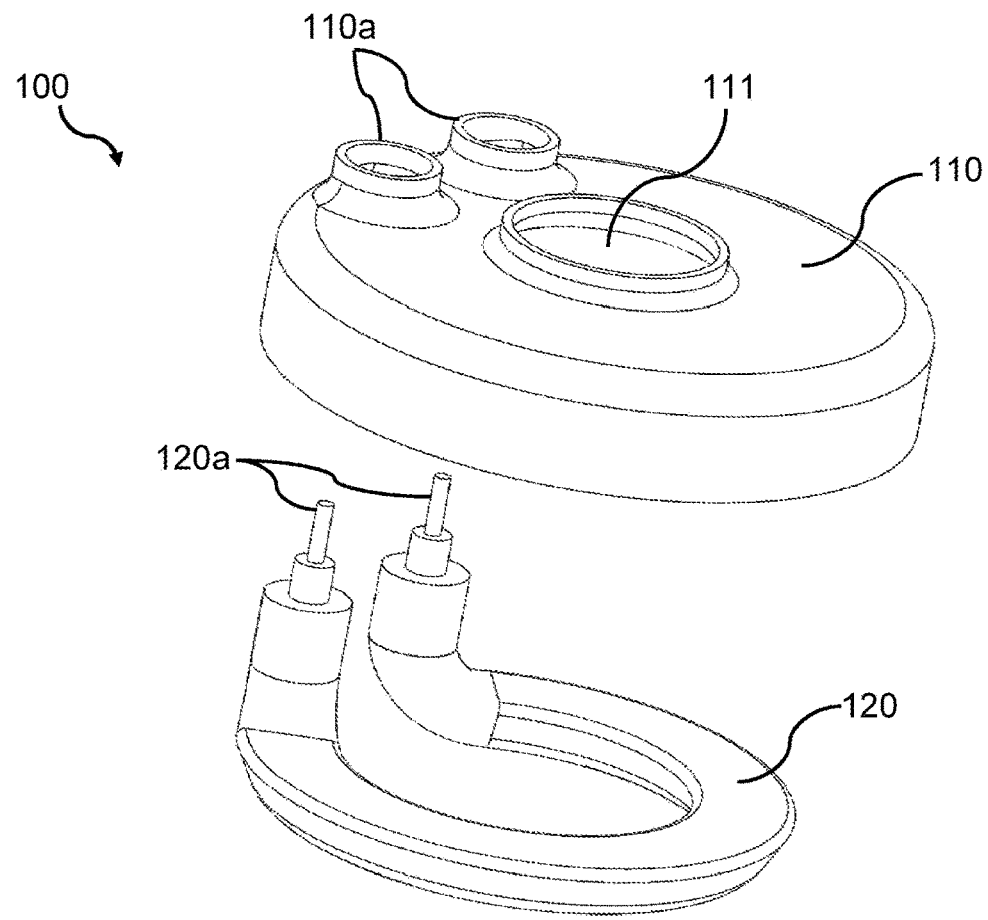
FIG. 1 shows schematically and exemplarily an embodiment of a heating system component.

FIG. 1 shows schematically and exemplarily an embodiment of a heating system component 100. Heating system component 100 comprises a carrier unit 110 and a heating unit 120.

Heating system component 100 may be connected to, e.g., a conveyor pump of a dishwashing machine. Heating system component 100 can be attached to the conveyor pump or to a conveyor pump housing during assembly of the domestic appliance. In another example, heating system component 100 can form a pre-assembled structural unit together with the conveyor pump.

As can be seen from FIG. 1, carrier unit 110 is a circular disc. In concentric relationship with its central axis (not shown), carrier unit 110 has a circular hole 111, through which a suction pipe of the conveyor pump is passed in sealing integrity in relation to the medium. At its outer peripheral edge, carrier unit 110 may engage over the edge of the conveyor pump's housing in sealing integrity in relation to the medium. That side of carrier unit 110, which faces in the direction of the lower edge of the sheet in FIG. 1, is in direct contact with the medium to be heated in the installed condition of the pump and can therefore be referred to as the wet side whereas the side of carrier unit 110, which faces towards the upper edge of the sheet, does not come into contact with the medium and can thus be referred to as the dry side.

In an example, heating system component 100 of FIG. 1 may be optimized for an "all-aluminum" option, where carrier unit 110 and heating unit 120 are both made of aluminum. For such a configuration, there may however be a problem that scale attaches to the aluminum when a household appliance is used incorrectly (e.g., when refraining from using dishwasher salt). In addition, there may be a problem that substances in the medium to be heated (such as, e.g., detergent) attack the aluminum and shorten the lifespan of carrier unit 110 and/or heating unit 120. In an example, the wet side of carrier unit 110 may be coated with a nonstick coating. A nonstick coating may protect carrier unit 110 against corrosion or other damage related to being in contact with water. In an example, heating unit 120 may also be coated with the same or with another nonstick coating in order to protect heating unit 120 against corrosion or other damage related to being in contact with water. In an example, the nonstick coating may be composed of a ceramics-based material. In an additional and/or alternative example, the nonstick coating may be produced by means of a sol-gel process. By employing a ceramics-based nonstick coating, the aluminum surfaces may be rendered dishwasher-safe. In another example, the nonstick coating may correspond to a plasma coating. A plasma coating in particular bears the advantage of being very robust against abrasive media, such as, e.g., silicates in a dishwasher liquid.

In a further example, only heating unit 120 is composed of aluminum, whereas carrier unit 110 may comprise corrosion-resistant steel, such as, e.g., stainless steel. Then, a nonstick coating need only be applied to heating unit 120. Further, heating unit 120 may e.g. be glued to carrier unit 110. In a further example, only heating unit 120 is composed of aluminum, whereas carrier unit 110 may be composed of a composite material. In an example, the composite material may be produced by means of a cold roll bonding process. The composite material may be chosen such that the wet side of carrier unit 110 is essentially composed of stainless steel, whereas the dry side of carrier unit 110 is essentially composed of aluminum. Then, a nonstick coating need only be applied to heating unit 120. In addition, as explained below, by choosing the dry side of carrier unit 110 to be essentially composed of aluminum, the feasibility to fix one or more temperature monitoring and/or control units to the dry side of carrier unit 110 by welding is improved.

During assembly of heating system component 100, heating unit connection parts 120*a* of heating unit 120 are passed through heating unit reception holes 110*a* of carrier unit 110. In an example, heating unit connection parts 120*a* may be used to connect heating unit 120 to a power source.

Figure 2:
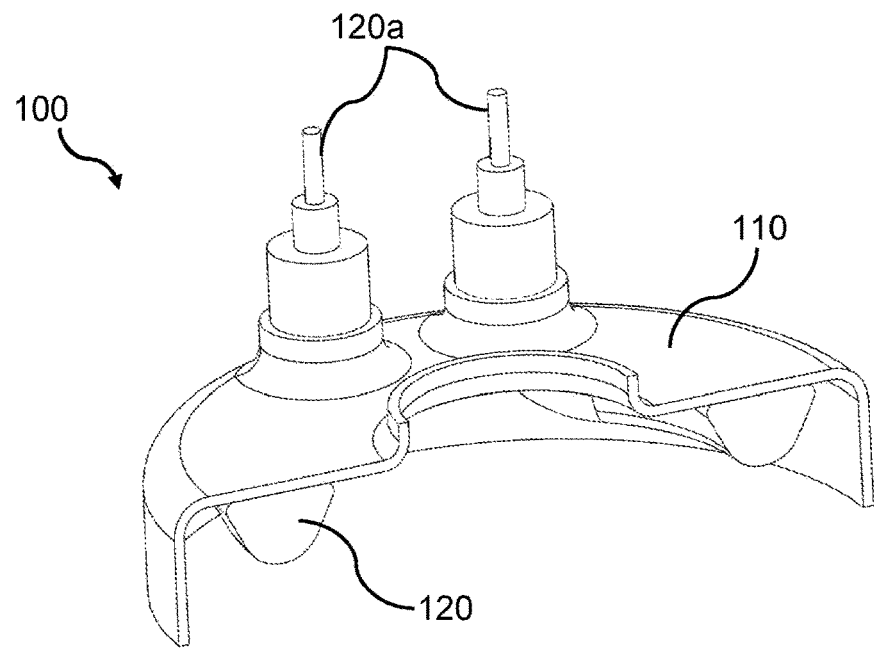
FIG. 2 shows schematically and exemplarily an assembled version of a heating system component.

FIG. 2 shows schematically and exemplarily an assembled version of heating system component 100. As can be seen from FIG. 2, heating unit 120 may be directly attached to carrier unit 110. Heating unit 120 exhibits a first cross-section in a direction perpendicular to a main axis of heating unit 120, the main axis extending in an axial direction of heating unit 120. In the example shown in FIG. 2, the first cross section corresponds to a trapezoid with rounded edges. As explained herein below, other cross section shapes of heating unit 120 are conceivable to the skilled person. A first side of heating unit 120 faces the wet side of carrier unit 110. In an example, the first side of heating unit 120 is essentially planar. The first side of heating unit 120 is thus essentially in full area contact with the wet side of carrier unit 110. Heat produced by heating unit 120 is transferred to the medium to be heated, wherein the medium is arranged on the wet side of carrier unit 110.

In an example, the first side of heating unit 120 is soldered to carrier unit 110. To that extent, a solder paste is brought onto the first side of heating unit 120 and/or on a corresponding part of the wet side of carrier unit 110. Next, the assembly is heated, e.g., by means of an oven. One problem with using soldering to connect heating unit 120 to carrier unit 110 is however that soldering is typically carried out at a temperature close to the melting temperature of aluminum. Consequently, aluminum parts, such as, e.g., heating unit 120 and/or carrier unit 110, are more difficult to process since they are less rigid when heated close to their melting temperature. It would thus be preferable for subsequent manufacturing steps if the aluminum parts are not soft, i.e., maintain their rigidity.

Therefore, in another example, the first side of heating unit 120 is attached to carrier unit 110 by means of laser welding. In that case, a soldering oven would not be needed. Further, in contrast to soldering, laser welding is possible also with aluminum of higher quality. In an example, $AlMg_{4.5}Mn$ may be used as material for carrier unit 110 and/or for heating unit 120. Aluminum of higher quality bears the advantage of exhibiting an increased mechanical strength, thereby improving the overall robustness.

In an example, a thermally conducting paste may be applied to one or both of the surfaces of carrier unit 110 and heating unit 120. By employing a thermally conducting paste, problems associated with an occurrence of voids between carrier unit 110 and heating unit 120 may be avoided.

Another possibility for addressing problems associated with an occurrence of voids between carrier unit 110 and heating unit 120 is to arrange a phase change compound between carrier unit 110 and heating unit 120. Such a compound changes its phase state above its phase change temperature and is thereby able to fill cracks, voids, slits, etc. In an embodiment, the phase change compound is applied to the surfaces of carrier unit 110 and/or heating unit 120 by means of a dispensing step. Dispensing typically implies that the phase change compound dries within a short period of time.

In another example, the first side of heating unit 120 is attached to carrier unit 110 by means of gluing. Gluing can be achieved, e.g., with an epoxy adhesive. When the first side of heating unit 120 is attached to carrier unit 110 by means of gluing, the process of applying a nonstick coating to heating unit 120 may be simplified. In particular, an appropriate glue (such as, e.g., an epoxy adhesive) may also attach the first side of heating unit 120 to carrier unit 110 if the first side is coated with a nonstick coating. Consequently, applying a nonstick coating can be performed even before attaching heating unit 120 to carrier unit 110. Further, applying a nonstick coating may be performed by immersing heating unit 120 into a nonstick coating medium for an appropriate amount of time so that a nonstick coating layer is formed at an outer surface of heating unit 120. Applying a nonstick coating to heating unit 120 is thus simplified and the overall manufacture of heating system component 100 is sped up.

In another example, the first side of heating unit 120 is attached to carrier unit 110 by means of ultrasonic welding. In another example, the first side of heating unit 120 is attached to carrier unit 110 by means of friction welding.

Figure 3:
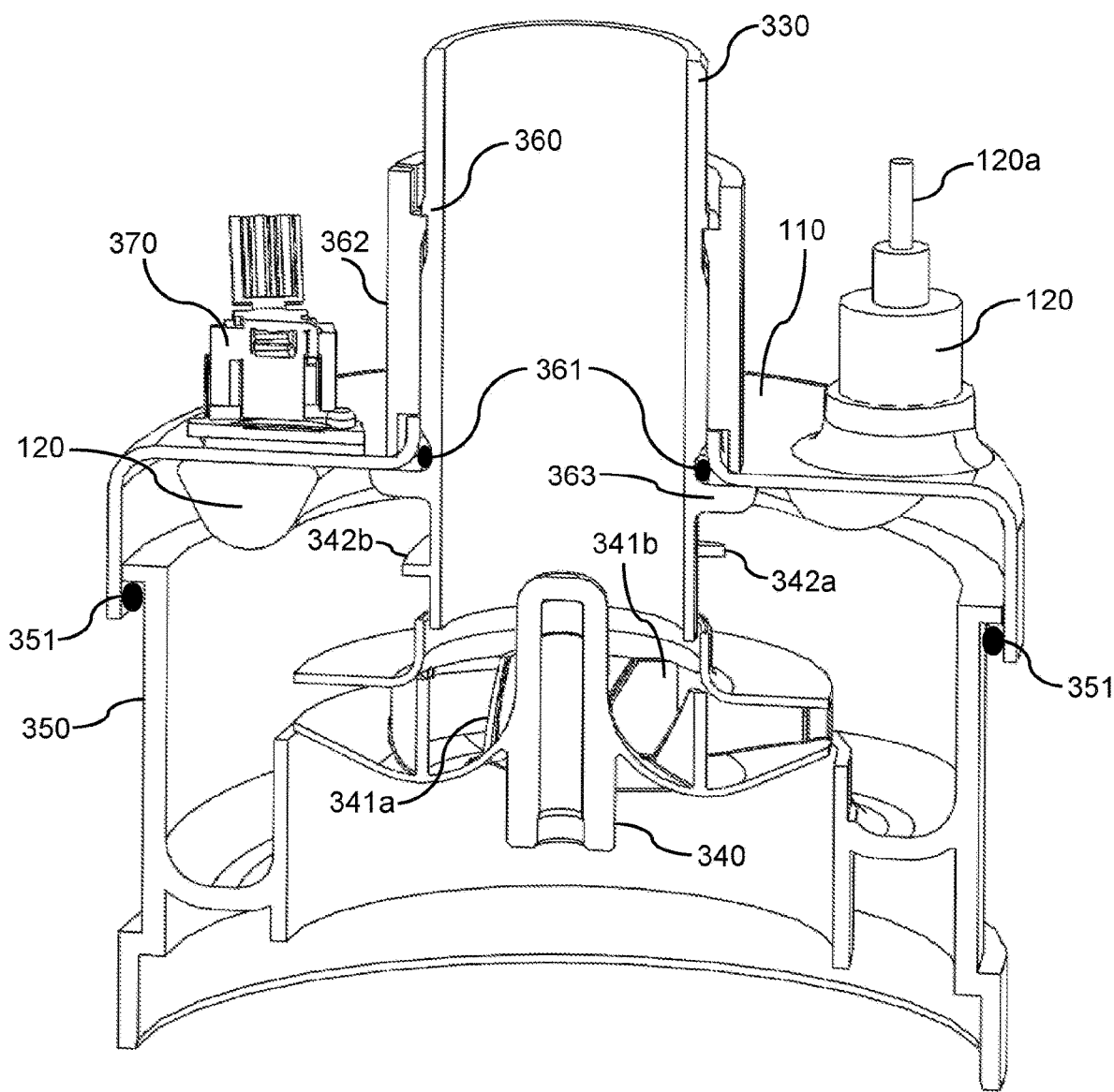
FIG. 3 shows schematically and exemplarily an embodiment of a heating system comprising a heating system component.

FIG. 3 shows schematically and exemplarily an embodiment of a heating system comprising heating system component 100. In an example, suction pipe 330 is passed through circular hole 111 of carrier unit 110. Impeller wheel 340 comprises impeller blades 341a, 341b to circulate the medium to be heated (such as, e.g., dishwasher water) within pump housing 350. In an example, suction pipe 330 further comprises steering fins 342a, 342b to support the distribution of the medium to be heated within pump housing 350. In an example, steering fins 342a, 342b are arranged in an opposite direction to impeller blades 341a, 341b. Such an arrangement accounts for additional turbulences to further improve the contact of the medium to be heated with an outer surface of heating unit 120. Thereby, the heat transfer from heating unit 120 to the medium to be heated is made more efficient.

In an example, carrier unit 110 is attached to pump housing 350 by means of force-fitting sealing connection 351. In an example, force-fitting sealing connection 351 may comprise a polyurethane adhesive. In another example, force-fitting sealing connection 351 may comprise a silicone adhesive. Other means to attach carrier unit 110 to pump housing 350 are described below.

In an example, suction pipe 330 is held in place by means of shape-locking connection means 360 of suction pipe 330. Shape-locking connection means 360 interlock with suction pipe fixing means 362. In an example, suction pipe fixing means 362 may be a fixing flange arranged around circular hole 111 on the dry side of carrier unit 110. In an example, shape-locking connection means 360 comprise at least one engagement section to engage with suction pipe fixing means 362. Suction pipe fixing means 362 in turn may comprise a suction pipe engagement section. During assembly, suction pipe 330 is introduced through circular hole 111 and suction pipe fixing means 362 from the wet side of carrier unit 110. In the example shown in FIG. 3, the engagement section of shape-locking connection means 360 is pushed beyond the suction pipe engagement section of suction pipe fixing means 362. Upon engaging, suction pipe 330 is prevented from being moved downwards again.

In an example, a protrusion section 363 is arranged at the lower part of suction pipe 330 in order to lock the axial motion of suction pipe 330 in an upwards direction. Thus, by a combination of protrusion section 363 at the lower part of suction pipe 330 with the interlocking between shape-locking connection means 360 and suction pipe fixing means 362, suction pipe 330 is fixed in an axial direction. In an example, protrusion section 363 extends circumferentially along the outer surface of suction pipe 330. Sealing means 361 are arranged between suction pipe 330 and carrier unit 110. In an example, sealing means 361 are arranged in a circumferential groove of suction pipe 330. In an example, sealing means 361 may be an O-ring. In another example, sealing means 361 may comprise a thermoplastic elastomer (TPE), which is extruded onto suction pipe 330. In an example, circular hole 111 is formed by bending the disc of carrier unit 110 in an upward direction as shown, e.g., in FIGS. 1 and 2. Then, sealing means 361 are arranged between circular hole 111 and suction pipe 330.

In a further example, suction pipe 330 may be fixed by employing force-fitting connection means. The force-fitting connection means may be obtained, e.g., by an ultrasonic-welding step, but other mechanisms are conceivable to the skilled person.

One concern with heating systems is reliable safeguarding against overheating. Typically, protection against overheating is achieved by employing temperature monitoring and/or control elements, such as, e.g., thermostats and/or thermal links. Thus, in the example shown in FIG. 3, temperature monitoring and/or control unit 370 is used to monitor or control a given temperature and to prevent that a maximum temperature is exceeded. In an example, temperature monitoring and/or control unit 370 is mounted to the dry side of carrier unit 110. Example applications of temperature monitoring and/or control units include, but are not limited to, household appliances such as dishwashers and washing machines, small electrical appliances such as coffeemakers, steam generators etc. or electrically monitored water heaters.

As a temperature sensing element, e.g., a vaulted bimetal disc may be used. The vaulted bimetal disc is preferably placed in direct contact with a mounting plate therefore reacting quickly to temperature. Having reached a predetermined temperature the bimetal disc operates and opens an electrical circuit. Once the temperature has fallen again under the predetermined temperature, the disc returns into its original position thereby closing the circuit again. Additionally and/or alternatively, a solder insert in the mounting plate may be in direct thermal contact with the surface that is to be monitored. When the preset temperature is reached, the solder melts causing a pin to move which results in the electrical contacts opening. For a two-component system combining temperature monitoring and temperature control, the two components temperature monitor and temperature control may have a common mounting plate, which is responsible for thermal conduction. This ensures that the thermal information for thermostat and thermal link always comes from the same source.

Temperature control elements may be used for applications where a maximum temperature must not be exceeded (such as, e.g., for example in coffee makers, irons, dishwashers, dryers) and to protect electric heating elements. A temperature control element typically has a melt solder insert in the mounting plate which is in direct thermal contact with the surface that is to be monitored. When the preset temperature is reached, the solder melts causing a pin to move which results in the electrical contacts opening.

Figure 4:
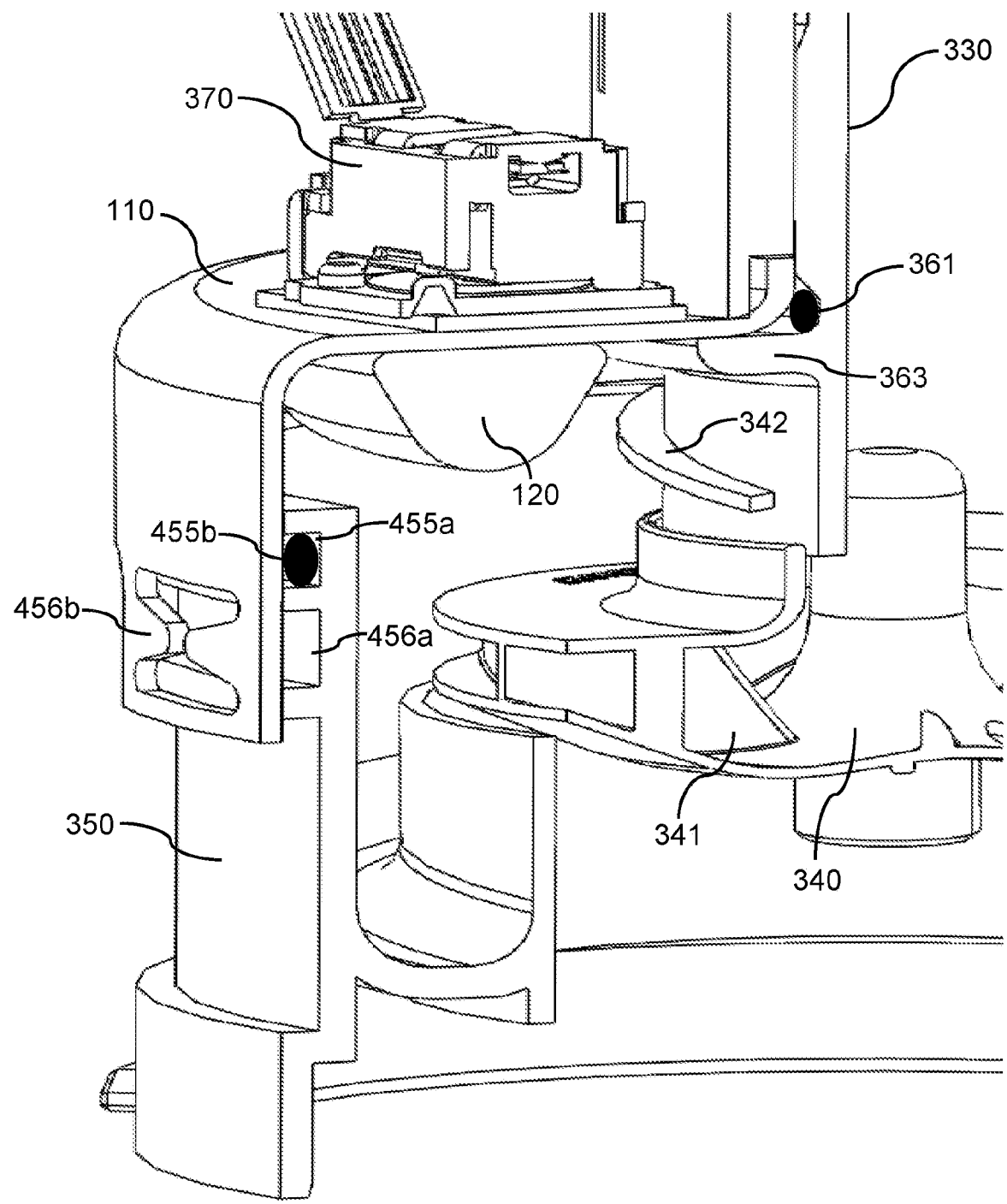
FIG. 4 shows schematically and exemplarily an embodiment of attaching a heating system component to a pump housing.

FIG. 4 shows schematically and exemplarily a further embodiment of attaching heating system component 100 to pump housing 350. In FIG. 4, pump housing 350 comprises pump housing sealing groove 455a and connecting groove 456a. In an example, pump housing sealing groove 455a and connecting groove 456a are arranged essentially circumferentially along an outer surface of pump housing 350. In FIG. 4, carrier unit 110 comprises shape-locking connection means 456b. In an example, shape-locking connection means 456b may comprise first and second tongue sections. First and second tongue sections may be bent towards pump housing 350 in order to engage with connecting groove 456a. By engaging the first and second tongue sections with connecting groove 456a, a shape-locking connection between carrier unit 110 and pump housing 350 is achieved.

Other means of mechanically attaching pump housing 350 to carrier unit 110 are conceivable to the skilled person. In an example, carrier unit 110 is attached to pump housing 350 by means of a crimping step. In another example, carrier unit 110 is attached to pump housing 350 by means of a caulking step. In another example, carrier unit 110 is attached to pump housing 350 by means of a clinching step.

Sealing means 455b are arranged between pump housing 350 and carrier unit 110. In an example, sealing means 455b are disposed within pump housing sealing groove 455a in sealing contact with carrier unit 110. In an example, sealing means 455b may be an O-ring. In another example, sealing means 455b may comprise a thermoplastic elastomer (TPE), which is extruded into pump housing sealing groove 455a, or, more generally, onto pump housing 350. An extruded sealing bears the advantage that deformations of pump housing 350 and/or of carrier unit 110 can be compensated. In addition, by employing an extruded sealing, the manufacturing process is made more flexible. This is because premade sealings (such as, e.g., O-rings) have a predetermined size format, whereas extruding a sealing on-the-fly makes it possible to seal different shapes and cross-sections.

When using temperature monitoring and/or control unit 370 (such as, e.g., thermal fuses) with continuous-flow water heaters, there is a problem when temperature monitoring and/or control unit 370 is fixed with, e.g., one or more screws, to carrier unit 110, as shown in FIG. 4. That is, when the lower side of temperature monitoring and/or control unit 370 is soldered to carrier unit 110, it may curve. Further, when fastening respective fixing screws on temperature monitoring and/or control unit 370, the temperature monitoring and/or control element may be lifted from carrier unit 110 and remain in the air above a hot location. As a consequence, the largest amount of heat in a location immediately above the heating unit cannot be released directly to temperature monitoring and/or control unit 370, but has to be released via, e.g., carrier unit 110 and/or the fixing screws. These effects result in an unacceptable (i.e., too slow) response time of temperature monitoring and/or control unit 370.

One idea to address the above-identified issue is to directly fix temperature monitoring and/or control unit 370 onto carrier unit 110, preferably in the direct vicinity of the hottest spot thereof. The fixing may be carried out by welding, preferably by laser welding. Employing laser welding for attaching temperature monitoring and/or control unit 370 involves the advantage of higher functionality and security as compared to prior art mounting approaches using, e.g., curved spring washers. In particular, fixing temperature monitoring and/or control unit 370 onto carrier unit 110 by welding significantly improves (i.e., reduces) temperature monitoring and/or control unit's 370 response time.

It is noted that in the example shown in FIG. 4, only one impeller blade 341 and only one steering fin 342 are visible. However, additional impeller blades and steering fins are conceivable by the skilled person.

Figure 5:
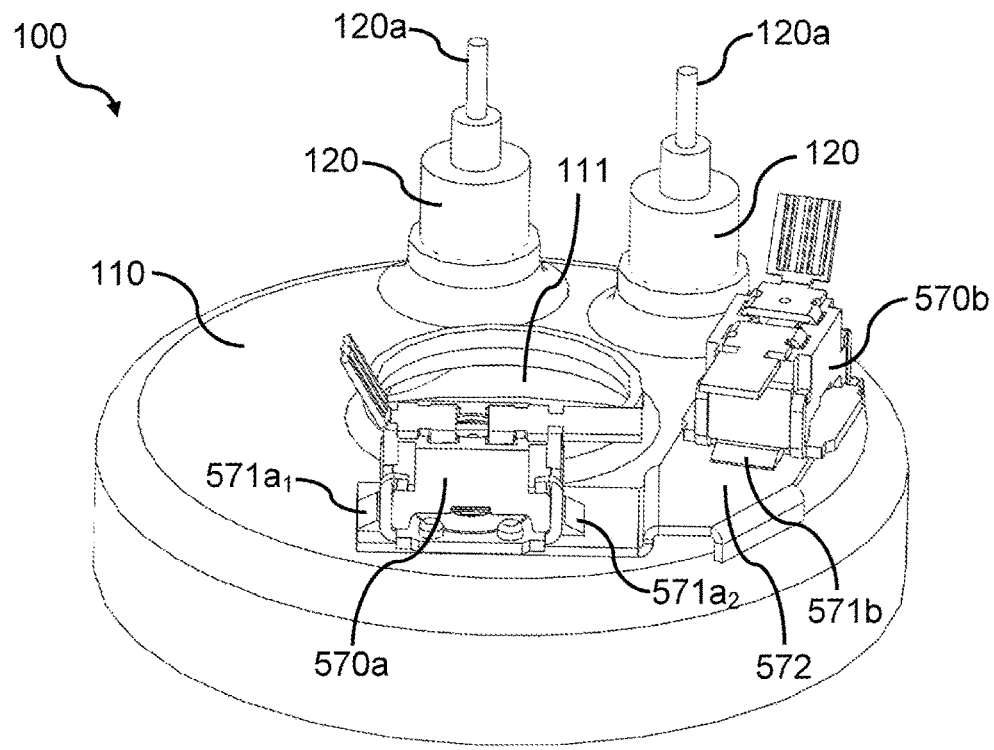
FIG. 5 shows schematically and exemplarily an embodiment of a heating system component having temperature monitoring and/or control units mounted thereon.

Examples for fixing temperature monitoring and/or control units 570a, 570b onto carrier unit 110 by welding are illustrated in FIG. 5. FIG. 5 shows schematically and exemplarily an embodiment of heating system component 100 having temperature monitoring and/or control units 570a, 570b mounted thereon. In an example, temperature monitoring and/or control units 570a, 570b are fixed to a mounting plate 572 on carrier unit 110 by means of a laser welding process. To this extent, a laser beam may be employed to attach temperature monitoring and/or control units 570a, 570b to mounting plate 572 on carrier unit 110. Lower sections of temperature monitoring and/or control units 570a, 570b may comprise beveled edges $571a_1$, $571a_2$, $571b$. By employing beveled edges $571a_1$, $571a_2$, $571b$, the laser beam can be directed such that it is prevented from getting too close to sensitive parts of temperature monitoring and/or control units 570a, 570b. A welded seam is thereby established along beveled edges $571a_1$, $571a_2$, $571b$. By employing laser-welding to attach temperature monitoring and/or control units 571a, 571b to mounting plate 572, response time and temperature overshoot can be significantly reduced. Mounting plate 572 may also be referred to as a thermal bridge. In an example, mounting plate 572 comprises $AlMg_3$. However, aluminum alloys, such as, e.g., $Al_{99.5}$ and $AlMg_1$, are suitable as well.

In an example, beveled edges $571a_1$, $571a_2$, $571b$ exhibit a bevel (i.e., a beveled edge connecting the two adjacent surfaces) of preferably 25° to 35° at wing ends of temperature monitoring and/or control units 571a, 571b. The bevel may be punched or stamped into the wing ends. Punching or stamping may be carried out by means of a punch cutter or stamping tool, respectively. Employing a bevel makes it easier for a laser beam to enter the material at a preferred angle of 90°. As a consequence of the laser beam entering at a more preferred angle, the welds turn solid and the melt enters mounting plate 572 in a cone-shaped manner. In particular, the laser power may be reduced by using a 45°-bevel, even more preferably a bevel of 25° to 35°. By applying a bevel to the wing ends of temperature monitoring and/or control units 571a, 571b, the laser power necessary to satisfactorily mount temperature monitoring and/or control units 571a, 571b can thus be reduced.

In an example, the laser beam is moved back and forth in an oscillating or pendulum motion. Thereby, it can be ensured that the beveled edge to be welded is correctly hit by the laser. Consequently, the attachment temperature monitoring and/or control units 571a, 571b is less prone to manufacturing errors and precision requirements can be relaxed.

In an example, temperature monitoring and/or control units 571a, 571b are attached by means of a spot-welding step. In another example, temperature monitoring and/or control units 571a, 571b are attached by means of gas tungsten arc welding, also known as TIG (tungsten, inert gas). In another example, temperature monitoring and/or control units 571a, 571b are attached by means of an ultrasonic-welding step.

An optimal thermal coupling of temperature monitoring and/or control element to the heating system results in an improved heat transfer and shorter response time. Consequently, strong heating powers can be controlled in a secure manner and positive effects on scaling of the tubes are observed. By welding the temperature monitoring and/or control element to the heating system, less mounting elements are needed, because, e.g., fixing elements, such as, e.g., screws, may be omitted. Accordingly, the mounting is eased in general. Automating the coupling process is possible as well. In accordance with the improved thermal coupling, a higher temperature threshold of the temperature monitoring and/or control element may be chosen. Consequently, the temperature monitoring and/or control system is rendered more robust overall in view of a potential formation of scale on the heating surface.

Figure 6:
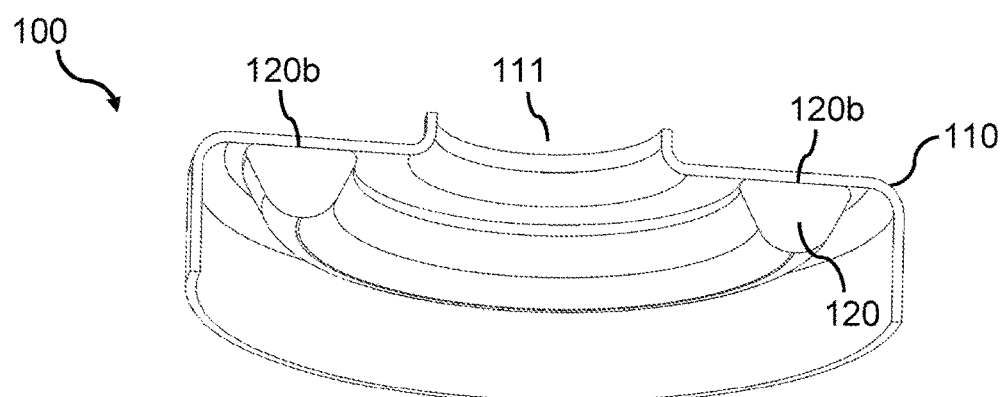
FIG. 6 shows schematically and exemplarily a heating system component.

FIG. 6 shows schematically and exemplarily an alternative view of heating system component 100. In the example shown, heating unit 120 may be directly attached to carrier unit 110. Heating unit 120 exhibits a first cross-section in a direction perpendicular to heating unit's 120 main axis. Here, the first cross section corresponds to a trapezoid with rounded edges. A first side 120b of heating unit 120 faces the wet side of carrier unit 110. In an example, the first side of heating unit 120 is essentially planar. The first side of heating unit 120 is thus essentially in full area contact with the wet side of carrier unit 110. Heat produced by heating unit 120 is transferred to the medium to be heated, wherein the medium is arranged on the wet side of carrier unit 110. As noted above, in an example, first side 120b of heating unit 120 may be attached to carrier unit 110 by means of laser welding. However, with the first cross section shown in FIG. 6, performing laser welding might bear some difficulties in order to correctly reach the respective material to be welded.

Figure 7:
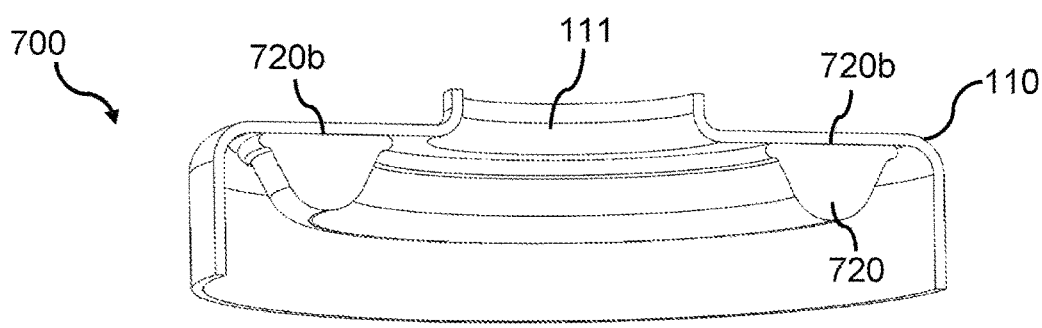
FIG. 7 shows schematically and exemplarily a further embodiment of a heating system component.

Therefore, FIG. 7 shows schematically and exemplarily a further embodiment of a heating system component 700. In the example shown, heating unit 720 may be directly attached to carrier unit 110. Heating unit 720 exhibits a second cross-section in a direction perpendicular to heating unit's 720 main axis. Here, the second cross section corresponds to a hat-like trapezoid with rounded edges. A first side 720b of heating unit 720 faces the wet side of carrier unit 110. In an example, first side 720b of heating unit 720 is essentially planar. First side 720b of heating unit 720 is thus essentially in full area contact with the wet side of carrier unit 110. Heat produced by heating unit 720 is transferred to the medium to be heated, wherein the medium is arranged on the wet side of carrier unit 110. In an example, first side 720b of heating unit 720 may be attached to carrier unit 110 by means of laser welding. As noted above, heating unit 720 exhibits a second cross section corresponding to a hat-like trapezoid with rounded edges. In an example, the hat-like shape may correspond to a bell-like shape. With such a cross section edge sections of heating unit 720 delimiting first side 720b comprise wing portions similar to a brimmed hat. These may be manufactured by folding a tube correspondingly before shaping heating unit 720. As a consequence, heating unit 720 offers a greater surface area for a laser in order to laser weld heating unit 720 to carrier unit 110. To this extent, laser welding heating unit 720 is less prone to manufacturing errors. Thus, heating system component 700 is more robust because heating unit 720 is solidly attached to the wet side of carrier unit 110, thereby preventing the medium to be heated from entering a space between first side 720b and the wet side of carrier unit 110.

A list of possible manufacturing methods comprises, but is not limited to, half-automatic assembly and fully-automatic assembly. The beveled edge geometry described herein is preferably optimized for an automatic positioning of the temperature monitoring and/or control units. That is, by choosing a bevel angle of preferably 25° to 35°, the bevel surface visible from the direction of the laser beam can be kept sufficiently large so that a possible misalignment of the temperature monitoring and/or control system components can be compensated for.

Figure 8:
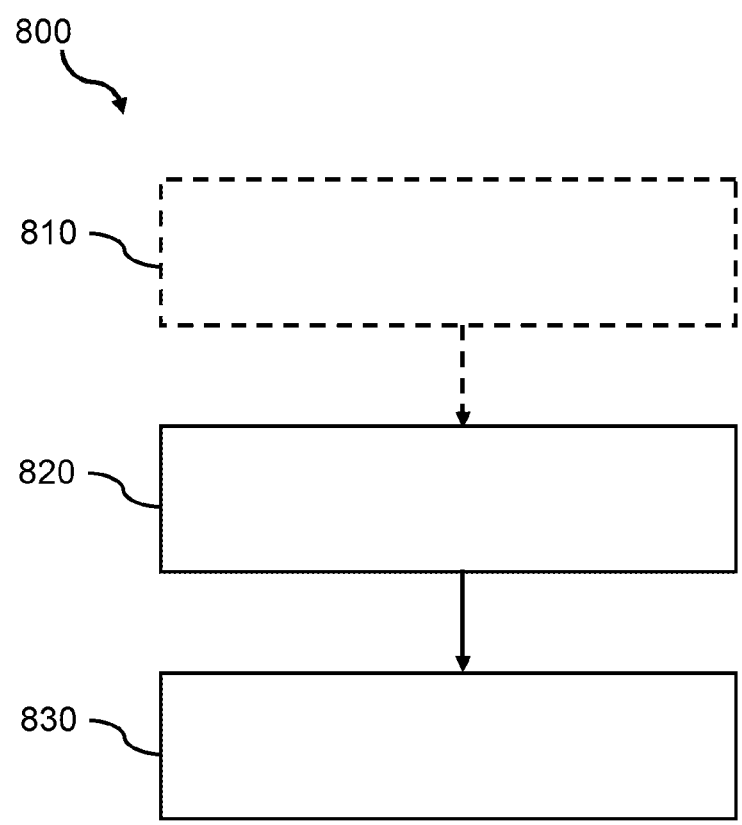
FIG. 8 shows schematically and exemplarily an embodiment of a method of providing a heating system component for a heating system for heating a fluid medium.

FIG. 8 shows schematically and exemplarily an embodiment of a method 800 of providing a heating system component for a heating system for heating a fluid medium. In a step 820, heating unit 120, 720 that is configured to be in contact with said fluid medium is arranged on a wet side of carrier unit 110, wherein said wet side corresponds to a surface of carrier unit 110 configured to be in contact with said fluid medium. In a step 830, heating unit 120, 720 is coupled to said wet side of carrier unit 110, wherein said coupling comprises at least one of a soldering step, a laser welding step, a gluing step, an ultrasonic welding step, and/or a friction welding step.

In an embodiment, before carrying out step 830 of coupling heating unit 120, 720 to said wet side of carrier unit 110, an optional step 810 comprises applying a nonstick coating to heating unit 120, 720, wherein coupling heating unit 120, 720 to said wet side of carrier unit 110 comprises gluing heating unit 120, 720 to said wet side of carrier unit 110.

Figure 9:
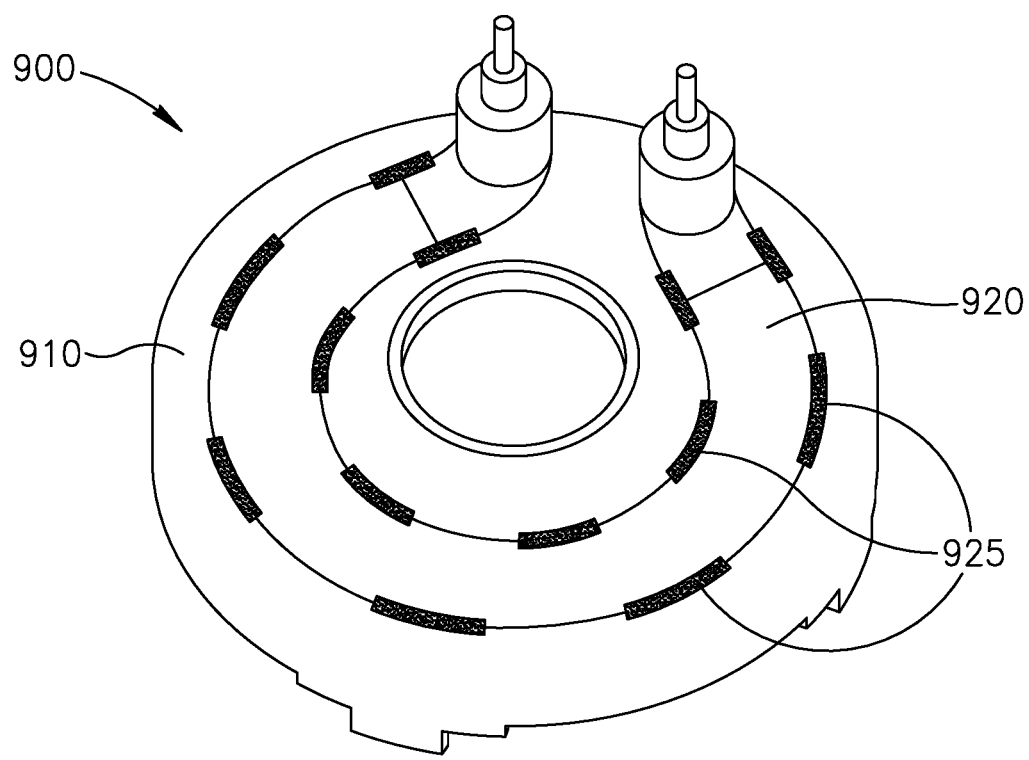
FIGS. 9 and 10 show schematically and exemplarily a further embodiment of a heating system component.

FIG. 9 shows schematically and exemplarily a further embodiment of a heating system component 900. Heating system component 900 comprises a carrier unit 910 and a heating unit 920. Carrier unit 910 comprises a wet side and a dry side. The wet side corresponds to a surface of carrier unit 910 configured to be in contact with the fluid medium. The dry side of carrier unit 910 is located on a surface opposite to the wet side. Heating unit 920 is arranged on the dry side of carrier unit 910. Heating unit 920 is coupled to carrier unit 910 by means of a coupling step. The coupling step comprises at least one of a soldering step, a laser welding step, a gluing step, an ultrasonic welding step, and/or a friction welding step. In the embodiment illustrated in FIG. 9, said coupling step comprises a quilting seam welding step, where quilting seams 925 are indicated in FIG. 9.

Carrier unit 910 may comprise a composite material. The composite material comprises at least an aluminum layer and a stainless steel layer. The stainless steel layer is arranged on the wet side of carrier unit 910. The aluminum layer is arranged on the dry side of carrier unit 910. In an example, the composite material may be produced by means of a cold roll bonding process.

In the embodiment illustrated in FIG. 9, carrier unit 910 further comprises groove 912. Groove 912 is configured to receive heating unit 920.

Heating unit 920 comprises a first cross section which is perpendicular to an axial direction of heating unit 920. The first cross section corresponds to a hat-like trapezoid with rounded edges. The hat-like trapezoid with rounded edges further preferably corresponds to a bell-like trapezoid with rounded edges.

In the embodiment illustrated in FIG. 9, a cross section of groove 912 corresponds to said first cross section of heating unit 920. In particular, heating unit 920 is arranged in groove 912. The cross section of groove 912 and the cross section of heating unit 920 are chosen such that at least a part of a surface of heating unit 920 and a part of said dry side form a flat face.

The necessary close contact between the surfaces of heating unit 920 and carrier unit 910 may be achieved by applying a press preload to heating unit 920 during the coupling step.

A thermally conducting paste 905 may be applied to one or both of the surfaces of carrier unit 910 and heating unit 920. By employing a thermally conducting paste 905, problems associated with an occurrence of voids between carrier unit 910 and heating unit 920 may be avoided.

Another possibility for addressing problems associated with an occurrence of voids between carrier unit 910 and heating unit 920 is to arrange a phase change compound between carrier unit 910 and heating unit 920. Such a compound changes its phase state above its phase change temperature and is thereby able to fill cracks, voids, slits, etc. In an embodiment, the phase change compound is applied to the surfaces of carrier unit 910 and/or heating unit 920 by means of a dispensing step. Dispensing typically implies that the phase change compound dries within a short period of time.

Figure 10:
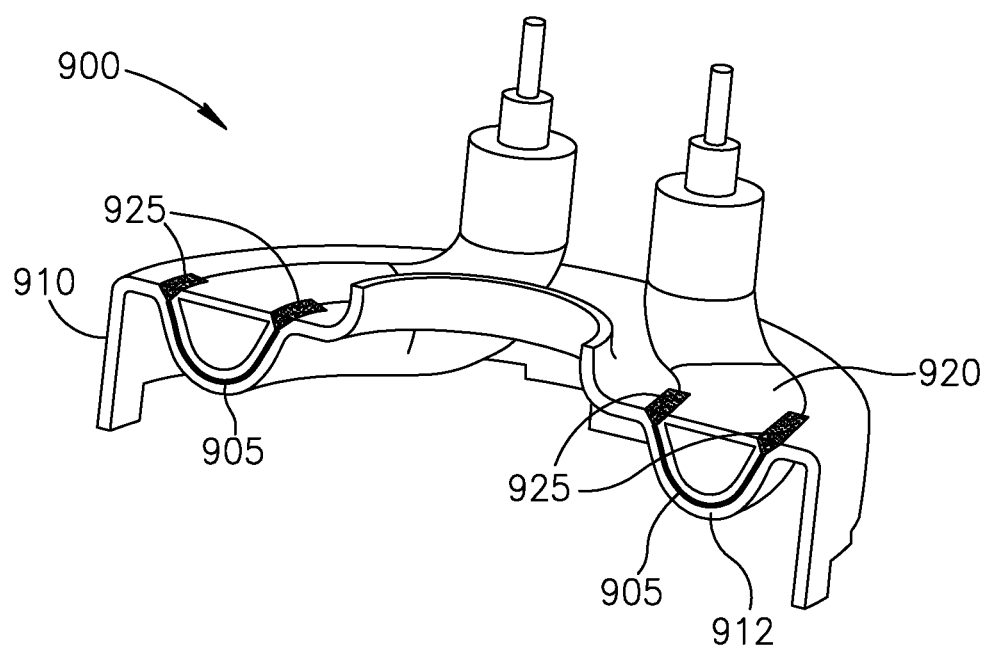

In the embodiment illustrated in FIG. 10, heating system component 900 is shown in a different view. In case the coupling step is a laser welding step, the laser may be focused onto or even inside carrier unit 910 so that heating unit 920 and carrier unit 910 are coupled to each other at a transition face. A form closure may be achieved by applying a preload from above by means of a pressing force.

Figure 11:
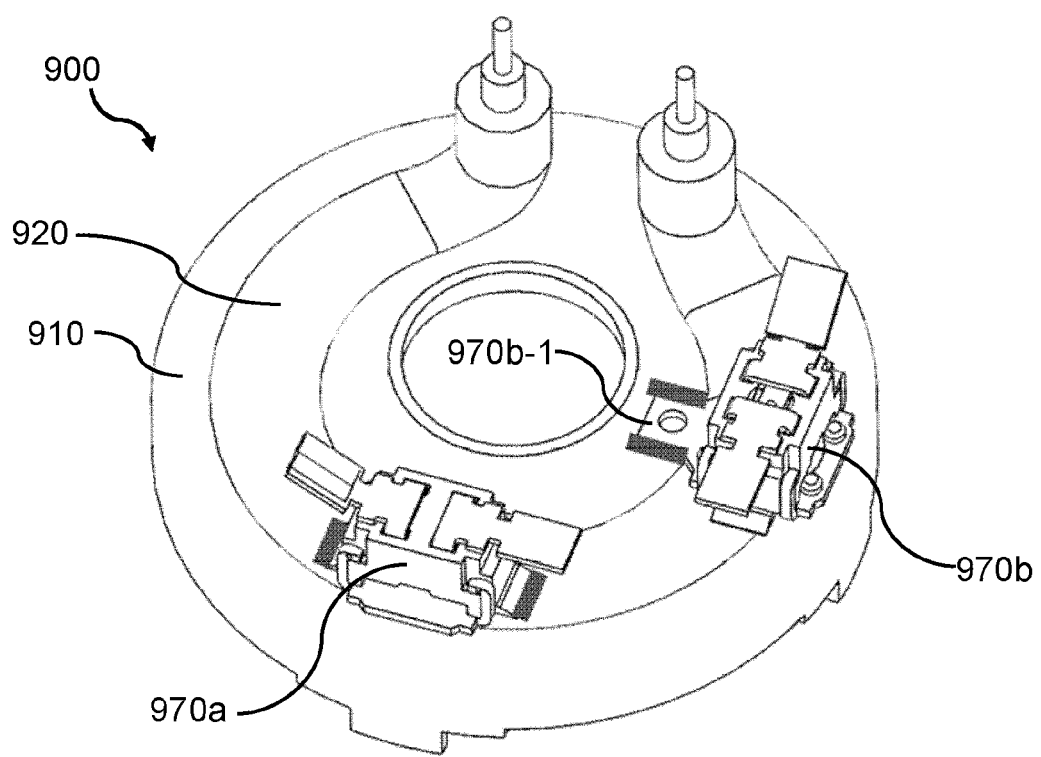
FIG. 11 shows schematically and exemplarily an embodiment of a heating system component having temperature monitoring and/or control units mounted thereon.

In the embodiment illustrated in FIG. 11, heating system component 900 further comprises temperature monitoring and/or control units 970a and 970b. Temperature monitoring and/or control units 970a and 970b comprise a lower surface. At least a part of the lower surface of temperature monitoring and/or control units 970a and 970b is in thermal contact with at least a part of an upper surface of heating unit 920. The lower surface of temperature monitoring and/or control units 970a and 970b and the upper surface of heating unit 920 are coupled to each other by means of a coupling step, wherein said coupling step comprises at least one of a laser welding step, a spot-welding step, a gas tungsten arc welding step, and/or an ultrasonic welding step.

In the embodiment illustrated in FIG. 11, at least a part of the lower surface of temperature monitoring and/or control unit 970b, namely carrier unit contacting part 970b-1, is in thermal contact with at least a part of an upper surface of carrier unit 910. Carrier unit contacting part 970b-1 and the upper surface of carrier unit 910 are coupled to each other by means of a coupling step, wherein said coupling step comprises at least one of a laser welding step, a spot-welding step, a gas tungsten arc welding step, and/or an ultrasonic welding step.

An example application of the invention generally relates to situations where a fluid medium needs to be heated in an efficient manner, for example in household appliances such as dishwashers, dryers, and washing machines, small electrical appliances such as coffeemakers, irons, steam generators etc. or in water heaters.

The temperature monitoring and/or control unit may comprise one or more temperature monitoring and/or control elements, such as, e.g., safety devices.

Other variations to the disclosed embodiments can be understood and effected by those skilled in the art in practicing aspects of the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like measuring a temperature performed by one or several units or devices can be performed by any other number of units or devices. For example, measuring a temperature can be performed by a single temperature monitoring and/or control unit or by any other number of different units. The determinations and/or the control of the heating system for heating fluid media can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems. The term "computer program" may also refer to embedded software.

Any reference signs in the claims should not be construed as limiting the scope.

The present disclosure relates to a heating system component for a heating system for heating a fluid medium, said heating system component comprising: a carrier unit comprising a wet side, wherein said wet side corresponds to a surface of said carrier unit configured to be in contact with said fluid medium; a heating unit arranged on said wet side of said carrier unit and configured to be in contact with said fluid medium; wherein said heating unit is coupled to said carrier unit by means of a coupling step, wherein said coupling step comprises at least one of a soldering step, a laser welding step, a gluing step, an ultrasonic welding step, and/or a friction welding step.

It follows a list of further embodiments of the invention:

Embodiment 1

A heating system component (100, 700) for a heating system for heating a fluid medium, said heating system component (100, 700) comprising:
 a carrier unit (110) comprising a wet side, wherein said wet side corresponds to a surface of said carrier unit (110) configured to be in contact with said fluid medium;
 a heating unit (120, 720) arranged on said wet side of said carrier unit (110) and configured to be in contact with said fluid medium;
 wherein said heating unit (120, 720) is coupled to said carrier unit (110) by means of a coupling step, wherein said coupling step comprises at least one of a soldering step, a laser welding step, a gluing step, an ultrasonic welding step, and/or a friction welding step.

Embodiment 2

The heating system component (100) with the features of embodiment 1, wherein said heating unit (120) comprises a first cross section which is perpendicular to an axial direction of said heating unit (120), wherein said first cross section corresponds to a trapezoid with rounded edges.

Embodiment 3

The heating system component (700) with the features of embodiment 1, wherein said heating unit (720) comprises a first cross section which is perpendicular to an axial direction of said heating unit (720), wherein said first cross section corresponds to a hat-like trapezoid with rounded edges; wherein said hat-like trapezoid with rounded edges preferably corresponds to a bell-like trapezoid with rounded edges.

Embodiment 4

A heating system component (100, 700) for a heating system for heating a fluid medium, said heating system component (100, 700) comprising:
 a temperature monitoring and/or control unit (370, 570a, 570b) comprising a lower surface;
 a carrier unit (110) comprising an upper surface;
 wherein at least a part of said lower surface of said temperature monitoring and/or control unit (370, 570a, 570b) is in thermal contact with at least a part of said upper surface of said carrier unit (110);

wherein said lower surface of said temperature monitoring and/or control unit (370, 570a, 570b) and said upper surface of said carrier unit (110) are coupled to each other by means of a coupling step, wherein said coupling step comprises at least one of a laser welding step, a spot-welding step, a gas tungsten arc welding step, and/or an ultrasonic welding step.

Embodiment 5

The heating system component (100, 700) with the features of embodiment 4, wherein said temperature monitoring and/or control unit (370, 570a, 570b) comprises a lower part having a beveled edge ($571a_1$, $571a_2$, 571b); wherein said beveled edge ($571a_1$, $571a_2$, 571b) is adjacent to said lower surface; wherein said beveled edge ($571a_1$, $571a_2$, 571b) comprises a bevel angle of less than 90°;

wherein said welded seam is located essentially along said beveled edge ($571a_1$, $571a_2$, 571b).

Embodiment 6

A heating system component (100, 700) for a heating system for heating a fluid medium, said heating system component (100, 700) comprising:
a carrier unit (110) comprising a wet side, wherein said wet side corresponds to a surface of said carrier unit (110) configured to be in contact with said fluid medium;
a housing unit (350);
coupling means (351, 456a, 456b) configured to couple said housing unit (350) to said carrier unit (110), wherein said coupling means (351, 456a, 456b) comprise at least one of a force-fitting connection mechanism and/or a shape-locking connection mechanism.

Embodiment 7

The heating system component (100, 700) with the features of embodiment 6, wherein said coupling means (351) comprise a force-fitting connection mechanism, wherein said force-fitting connection mechanism comprises a force-fitting sealing connection (351); wherein said force-fitting sealing connection (351) preferably comprises at least one of a polyurethane adhesive and/or a silicone adhesive.

Embodiment 8

The heating system component (100, 700) with the features of embodiment 6, wherein said coupling means (456a, 456b) comprise a shape-locking connection mechanism,
wherein said housing unit (350) comprises a connecting groove (456a), and wherein said carrier unit (110) comprises shape-locking connection means (456b) configured to interlock with said connecting groove (456a).

Embodiment 9

The heating system component (100, 700) with the features of embodiment 8, wherein said housing unit (350) preferably comprises a sealing groove (455a), and wherein said heating system component (100, 700) preferably comprises sealing means (455b) configured to be arranged in said sealing groove (455a).

Embodiment 10

The heating system component (100, 700) with the features of embodiment 8, wherein said shape-locking connection means (456b) comprise tongue-like features configured to be bent towards said connecting groove (456a) in order to interlock therewith.

Embodiment 11

A heating system component (100, 700) for a heating system for heating a fluid medium, said heating system component (100, 700) comprising:
a carrier unit (110) comprising a wet side, wherein said wet side corresponds to a surface of said carrier unit (110) configured to be in contact with said fluid medium; wherein said carrier unit (110) comprises a circular hole (111);
a fluid conducting unit (330) configured to be inserted through said circular hole (111) of said carrier unit (110);
coupling means (360, 361, 362, 363) configured to couple said fluid conducting unit (350) to said carrier unit (110), wherein said coupling means (360, 361, 362, 363) comprise at least one of a force-fitting connection mechanism and/or a shape-locking connection mechanism.

Embodiment 12

The heating system component (100, 700) with the features of embodiment 11, wherein said coupling means comprise a force-fitting connection mechanism, wherein said force-fitting connection mechanism is obtained by an ultrasonic-welding step.

Embodiment 13

The heating system component (100, 700) with the features of embodiment 11, wherein said coupling means (360, 361, 362, 363) comprise a shape-locking connection mechanism, wherein said shape-locking connection mechanism comprises shape-locking connection means (360) arranged on an outer surface of said fluid conducting unit (350), a protrusion section (363) arranged on an outer surface of said fluid conducting unit (350), and fixing means (362) configured to engage with said shape-locking connection means (360);
wherein said protrusion section (363) is configured to be arranged on said wet side of said carrier unit (110).

Embodiment 14

The heating system component (100, 700) with the features of embodiment 13, wherein said shape-locking connection means (360) comprise at least one engagement section to engage with said fixing means (362), wherein said at least one engagement section comprises an engagement groove section and an engagement hook section, and wherein said fixing means (362) comprises a second engagement hook section configured to interlock with said engagement groove section and said engagement hook section.

Embodiment 15

The heating system component (100, 700) with the features of embodiment 14, wherein said fixing means (362)

comprise a fixing flange arranged around said circular hole (111) on a dry side of said carrier unit (110), wherein said dry side of said carrier unit (110) is a surface of said carrier unit (110) opposite to said wet side of said carrier unit (110).

Embodiment 16

A heating system component (100, 700) for a heating system for heating a fluid medium, said heating system component (100, 700) comprising:
- a carrier unit (110) comprising a wet side, wherein said wet side corresponds to a surface of said carrier unit (110) configured to be in contact with said fluid medium;
- a heating unit (120, 720) arranged on said wet side of said carrier unit (110) and configured to be in contact with said fluid medium; wherein said heating unit (120, 720) comprises a first nonstick coating layer;
- wherein said heating unit (120, 720) is coupled to said carrier unit (110) by means of a coupling step, wherein said coupling step comprises a gluing step.

Embodiment 17

The heating system component (100, 700) with the features of embodiment 16, wherein said carrier unit (110) comprises aluminum, and wherein said wet side of said carrier unit (110) comprises a second nonstick coating layer.

Embodiment 18

The heating system component (100, 700) with the features of one of embodiments 16 or 17, wherein said nonstick coating comprises at least one of a ceramics-based material, a sol-gel coating, and/or a plasma coating.

Embodiment 19

A method (800) of providing a heating system component (100, 700) for a heating system for heating a fluid medium, said method (800) comprising:
- applying (810) a nonstick coating to a heating unit (120, 720),
- after said applying (810), attaching (830) said heating unit (120, 720) to a wet side of a carrier unit (110), wherein said wet side corresponds to a surface of said carrier unit (110) configured to be in contact with said fluid medium;
- wherein attaching (830) said heating unit (120, 720) to said wet side of a carrier unit (110) comprises gluing said heating unit (120, 720) to said wet side of a carrier unit (110).

Embodiment 20

A heating system component (100, 700) for a heating system for heating a fluid medium, said heating system component (100, 700) comprising:
- a carrier unit (110) comprising a wet side, wherein said wet side corresponds to a surface of said carrier unit (110) configured to be in contact with said fluid medium;
- a heating unit (120, 720) arranged on said wet side of said carrier unit (110) and configured to be in contact with said fluid medium; wherein said heating unit (120, 720) comprises a first nonstick coating layer;
- wherein said carrier unit (110) comprises a composite material, said composite material comprising at least an aluminum layer and a stainless steel layer, wherein said stainless steel layer is arranged on said wet side of said carrier unit (110), and wherein said aluminum layer is arranged on a dry side of said carrier unit (110), wherein said dry side of said carrier unit (110) corresponds to a surface of said carrier unit (110) arranged opposite to said wet side of said carrier unit (110), and wherein said composite material is preferably produced by means of a cold roll bonding process.

Embodiment 21

The heating system component (100, 700) with the features of embodiment 20, wherein said heating unit (120, 720) is coupled to said carrier unit (110) by means of a coupling step, wherein said coupling step comprises a laser welding step.

Embodiment 22

A heating system for heating a fluid medium, said heating system comprising:
- a heating system component (100, 700) with the features of one of embodiments 1 to 21.

Embodiment 23

A household appliance, preferably a dishwashing apparatus, comprising a heating system with the features of embodiment 22.

Embodiment 24

A heating system component (900) for a heating system for heating a fluid medium, said heating system component (900) comprising: a carrier unit (910) comprising a wet side and a dry side, wherein said wet side corresponds to a surface of said carrier unit (910) configured to be in contact with said fluid medium, wherein said dry side is located on a surface opposite to said wet side; a heating unit (920) arranged on said dry side of said carrier unit (910); wherein said heating unit (920) is coupled to said carrier unit (910) by means of a coupling step, wherein said coupling step comprises at least one of a soldering step, a laser welding step, a gluing step, an ultrasonic welding step, and/or a friction welding step.

Embodiment 25

The heating system component (900) with the features of embodiment 24, wherein said carrier unit (910) comprises a composite material, said composite material comprising at least an aluminum layer and a stainless steel layer, wherein said stainless steel layer is arranged on said wet side of said carrier unit (910), and wherein said aluminum layer is arranged on said dry side of said carrier unit (910).

Embodiment 26

The heating system component (900) with the features of one of embodiments 24 to 25, wherein said carrier unit (910) further comprises a groove (921) that is configured to receive said heating unit (920).

Embodiment 27

The heating system component (900) with the features of one of embodiments 24 to 26, wherein said heating unit (920) comprises a first cross section which is perpendicular to an axial direction of said heating unit (920), wherein said first cross section corresponds to a hat-like trapezoid with rounded edges; wherein said hat-like trapezoid with rounded edges preferably corresponds to a bell-like trapezoid with rounded edges.

Embodiment 28

The heating system component (900) with the features of embodiment 27, wherein a cross section of said groove (921) corresponds to said first cross section of said heating unit (920).

Embodiment 29

The heating system component (900) with the features of one of embodiments 27 to 28, wherein said heating unit (920) is arranged in said groove (921), wherein said cross section of said groove (921) and said first cross section of said heating unit (920) are chosen such that at least a part of a surface of said heating unit (920) and a part of said dry side form a flat face.

Embodiment 30

The heating system component (900) with the features of one of embodiments 24 to 30, wherein said coupling step comprises a quilting seam welding step.

Embodiment 31

The heating system component (900) with the features of one of embodiments 24 to 30, wherein the heating system component (900) further comprises a temperature monitoring and/or control unit (970a, 970b) comprising a lower surface; wherein at least a part of said lower surface of said temperature monitoring and/or control unit (970a, 970b) is in thermal contact with at least a part of an upper surface of said heating unit (920); wherein said lower surface of said temperature monitoring and/or control unit (970a, 970b) and said upper surface of said heating unit (920) are coupled to each other by means of a coupling step, wherein said coupling step comprises at least one of a laser welding step, a spot-welding step, a gas tungsten arc welding step, and/or an ultrasonic welding step.

Embodiment 32

The heating system component (900) with the features of embodiment 31, wherein at least a part of said lower surface of said temperature monitoring and/or control unit (970a, 970b) is in thermal contact with at least a part of an upper surface of said carrier unit (910); wherein said lower surface of said temperature monitoring and/or control unit (970a, 970b) and said upper surface of said carrier unit (910) are coupled to each other by means of a coupling step, wherein said coupling step comprises at least one of a laser welding step, a spot-welding step, a gas tungsten arc welding step, and/or an ultrasonic welding step.

Moreover, aspects and features of the various embodiments described above can be combined to provide further embodiments. The foreign patent application listed in the Application Data Sheet, namely European Application No. 14189693.6-1808, filed Oct. 21, 2014, from which the present application claims foreign priority, is incorporated herein by reference in its entirety. Aspects of the embodiments can be modified, if necessary to employ concepts of the application to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A heating system component for a heating system for heating a fluid medium, said heating system component comprising:
a carrier unit having a wet side and a dry side, wherein said wet side corresponds to a surface of said carrier unit configured to be in contact with said fluid medium, and wherein said dry side is located on a surface opposite to said wet side;
a heating unit arranged on said dry side of said carrier unit and isolated from said fluid medium by the carrier unit; and
a thermally conducting paste arranged between said carrier unit and said heating unit,
wherein said carrier unit comprises a groove having a bell-shaped cross-sectional profile with a rounded apex that points toward the wet side and a flat base opposite of the rounded apex, wherein said groove is configured to receive said heating unit, and wherein said heating unit has a corresponding bell-shaped cross-sectional profile,
wherein the thermally conducting paste is arranged within the groove between said carrier unit and said heating unit, including between the rounded apex of the groove and a correspondingly shaped portion of the heating unit, and
wherein said heating unit is welded directly to said carrier unit by at least one welded quilting seam.

2. The heating system component of claim 1, further comprising:
a temperature monitoring and/or control unit comprising a lower surface;
wherein at least a part of said lower surface of said temperature monitoring and/or control unit is in thermal contact with at least a part of an upper surface of said carrier unit;
wherein said lower surface of said temperature monitoring and/or control unit and said upper surface of said carrier unit are coupled to each other by laser welding.

3. The heating system component of claim 2, wherein said temperature monitoring and/or control unit comprises a lower part having a beveled edge;
wherein said beveled edge is adjacent to said lower surface; wherein said beveled edge comprises a bevel angle of less than 90°; and
wherein a welded seam is located along said beveled edge.

4. The heating system component of claim 1,
wherein said carrier unit comprises a circular hole;
wherein said heating system component further comprises
a fluid conducting unit configured to be inserted through said circular hole of said carrier unit; and
a coupling device configured to couple said fluid conducting unit to said carrier unit, wherein said coupling device comprises at least one of a force-fitting connection mechanism and a shape-locking connection mechanism.

* * * * *